US012720549B2

(12) United States Patent
Alwar et al.

(10) Patent No.: US 12,720,549 B2
(45) Date of Patent: Aug. 25, 2026

(54) RESOURCE STATUS REPORTING

(71) Applicant: Nokia Technologies Oy, Espoo (FI)

(72) Inventors: Ethiraj Alwar, Bangalore (IN); Claudiu Mihailescu, Versailles (FR); Krzysztof Maliga, Wroclaw (PL); Sankaran Balasubramaniam, Bangalore (IN); Andres Arjona, Tokyo (JP); Hakon Helmers, Sceaux (FR)

(73) Assignee: Nokia Technologies Oy, Espoo (FI)

( * ) Notice: Subject to any disclaimer, the term of this patent is extended or adjusted under 35 U.S.C. 154(b) by 257 days.

(21) Appl. No.: 18/736,661

(22) Filed: Jun. 7, 2024

(65) Prior Publication Data

US 2024/0414714 A1 Dec. 12, 2024

(30) Foreign Application Priority Data

Jun. 8, 2023 (IN) ............................ 202311039277

(51) Int. Cl.
*H04W 72/20* (2023.01)

(52) U.S. Cl.
CPC .................................. *H04W 72/20* (2023.01)

(58) Field of Classification Search
CPC .................................................... H04W 72/20
See application file for complete search history.

(56) References Cited

U.S. PATENT DOCUMENTS

2024/0205690 A1* 6/2024 Kurian .................. H04W 72/52
2024/0251344 A1* 7/2024 Maggi ............... H04W 52/0206

FOREIGN PATENT DOCUMENTS

CN 110035472 A 7/2019
WO 2021/215886 A1 10/2021
WO 2022/031198 A1 2/2022
WO 2022/223498 A1 10/2022

OTHER PUBLICATIONS

"Discussion on solutions of AI-based energy saving in case of split architecture", 3GPP TSG-RAN WG3 #114bis-e, R3-210819, China Telecom, Agenda Item: 18.4.1, Jan. 17-26, 2022, pp. 1-13.
"3rd Generation Partnership Project; Technical Specification Group Radio Access Network; NG-RAN; F1 application protocol (F1AP) (Release 17)", 3GPP TS 38.473 V17.4.1, Apr. 2023, pp. 1-690.
"3rd Generation Partnership Project; Technical Specification Group Radio Access Network; NG-RAN; Xn application protocol (XnAP) (Release 17)", 3GPP TS 38.423 V17.4.0, Mar. 2023, pp. 1-620.
"Revised WID: Enhancements of network energy savings for NR", 3GPP TSG RAN Meeting #104, RP-241183, Ericsson, Agenda Item: 9.3.1.5, Jun. 17-20, 2024, pp. 1-6.
Extended European Search Report received for corresponding European Patent Application No. 24169332.4, dated Oct. 9, 2024, 10 pages.

* cited by examiner

*Primary Examiner* — Won Tae C Kim
(74) *Attorney, Agent, or Firm* — Barta Jones, PLLC

(57) ABSTRACT

Example embodiments of the present disclosure relate to apparatuses, methods, and computer readable storage medium for resource status reporting. In a method, a first apparatus receives a resource status request for at least one resource group from a second apparatus. Then, the first apparatus transmits a resource status indication for the at least one resource group to the second apparatus.

20 Claims, 10 Drawing Sheets

RESOURCE STATUS REPORTING

FIELDS

Various example embodiments of the present disclosure generally relate to the field of telecommunication and in particular, to apparatuses, methods and computer readable storage medium for resource status reporting.

BACKGROUND

Release-18 (Rel-18) supports a mechanism for a gNodeB-centralized unit (gNB-CU) to trigger "one-shot" or "periodic" report per resource, such as per cell or per synchronization signal and physical broadcast channel (PBCH) block (SSB) beam, from gNodeB-distributed unit (gNB-DU) over F1 application protocol (F1AP) interface in a split gNB architecture. However, this mechanism has several issues due to one-shot or periodic reports, reporting trigger basis, and/or the like.

SUMMARY

In a first aspect of the present disclosure, there is provided a first apparatus. The first apparatus comprises at least one processor; and at least one memory storing instructions that, when executed by the at least one processor, cause the first apparatus at least to: receive, from a second apparatus, a resource status request for at least one resource group; and transmit, to the second apparatus, a resource status indication for the at least one resource group.

In a second aspect of the present disclosure, there is provided a second apparatus. The second apparatus comprises at least one processor; and at least one memory storing instructions that, when executed by the at least one processor, cause the second apparatus at least to: transmit, to a first apparatus, a resource status request for at least one resource group; and receive, from the first apparatus, a resource status indication for the at least one resource group.

In a third aspect of the present disclosure, there is provided a method. The method comprises: receiving, from a second apparatus, a resource status request for at least one resource group; and transmitting, to the second apparatus, a resource status indication for the at least one resource group.

In a fourth aspect of the present disclosure, there is provided a method. The method comprises: transmitting, to a first apparatus, a resource status request for at least one resource group; and receiving, from the first apparatus, a resource status indication for the at least one resource group.

In a fifth aspect of the present disclosure, there is provided a first apparatus. The first apparatus comprises means for receiving, from a second apparatus, a resource status request for at least one resource group; and means for transmitting, to the second apparatus, a resource status indication for the at least one resource group.

In a sixth aspect of the present disclosure, there is provided a second apparatus. The second apparatus comprises means for transmitting, to a first apparatus, a resource status request for at least one resource group; and means for receiving, from the first apparatus, a resource status indication for the at least one resource group.

In a seventh aspect of the present disclosure, there is provided a computer readable medium. The computer readable medium comprises instructions stored thereon for causing an apparatus to perform at least the method according to the third or fourth aspect.

It is to be understood that the Summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where.

Throughout the drawings, the same or similar reference numerals represent the same or similar element.

DETAILED DESCRIPTION

Figure 1A:
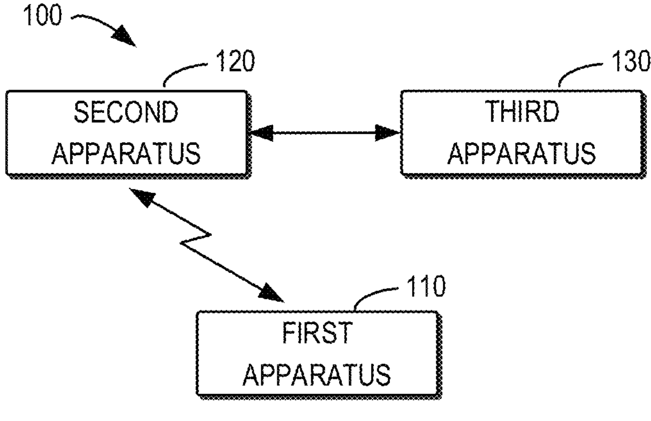
FIG. 1A illustrates an example communication environment in which example embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. Embodiments described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first," "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used herein, unless stated explicitly, performing a step "in response to A" does not indicate that the step is performed immediately after "A" occurs and one or more intervening steps may be included.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and
(b) combinations of hardware circuits and software, such as (as applicable):
  (i) a combination of analog and/or digital hardware circuit(s) with software/firmware and
  (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as New Radio (NR), Long Term Evolution (LTE), LTE-Advanced (LTE-A), Wideband Code Division Multiple Access (WCDMA), High-Speed Packet Access (HSPA), Narrow Band Internet of Things (NB-IoT) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, the fifth generation (5G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As used herein, the term "network device" refers to a node in a communication network via which a terminal device accesses the network and receives services therefrom. The network device may refer to a base station (BS) or an access point (AP), for example, a node B (NodeB or NB), an evolved NodeB (eNodeB or eNB), an NR NB (also referred to as a gNB), a Remote Radio Unit (RRU), a radio header (RH), a remote radio head (RRH), a relay, an Integrated Access and Backhaul (IAB) node, a low power node such as a femto, a pico, a non-terrestrial network (NTN) or non-ground network device such as a satellite network device, a low earth orbit (LEO) satellite and a geosynchronous earth orbit (GEO) satellite, an aircraft network device, and so forth, depending on the applied terminology and technology. In some example embodiments, radio access network (RAN) split architecture comprises a Centralized Unit (CU) and a Distributed Unit (DU) at an IAB donor node. An IAB node comprises a Mobile Terminal (IAB-MT) part that behaves like a UE toward the parent node, and a DU part of an IAB node behaves like a base station toward the next-hop IAB node.

The term "terminal device" refers to any end device that may be capable of wireless communication. By way of example rather than limitation, a terminal device may also be referred to as a communication device, user equipment (UE), a Subscriber Station (SS), a Portable Subscriber Station, a Mobile Station (MS), or an Access Terminal (AT). The terminal device may include, but not limited to, a mobile phone, a cellular phone, a smart phone, voice over IP (VoIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. The terminal device may also correspond to a Mobile Termination (MT) part of an IAB node (e.g., a relay node). In the following description, the terms "terminal device", "communication device", "terminal", "user equipment" and "UE" may be used interchangeably.

As used herein, the term "resource," "transmission resource," "resource block," "physical resource block" (PRB), "uplink resource," or "downlink resource" may refer to any resource for performing a communication, for example, a communication between a terminal device and a network device, such as a resource in time domain, a resource in frequency domain, a resource in space domain, a resource in code domain, or any other resource enabling a communication, and the like. In the following, unless explicitly stated, a resource in both frequency domain and time domain will be used as an example of a transmission resource for describing some example embodiments of the present disclosure. It is noted that example embodiments of the present disclosure are equally applicable to other resources in other domains.

As mentioned above, a mechanism for the gNB-CU to trigger "one-shot/periodic" reports per resource (such as per cell or per SSB beam) from the gNB-DU is enabled in Rel-18, which, however, has some issues. In an aspect, a resource status request procedure may be used to start periodic reports or a one-shot report from a distributed unit (DU). In general, it is not preferable to have periodic reports exchanged between logical nodes, which may cause signaling overhead and data received from the reports to be not always useful at a receiving node unless the receiving node has to make a decision using the received data. In a case of a split architecture, such as a centralized unit (CU) with many DUs, the CU will receive too much data if the periodic reporting is enabled from all the DUs for all cells.

In another aspect, the CU may start and stop periodic reports due to a specific event or trigger based on its own logic or implementation. The CU may potentially use metrics, such as active user count (for example, Layer 3 (L3)), to trigger a more detailed resource status report from a DU. However, there is no direct correlation between the metrics available at the CU and the load at the DU. For example, a lesser number of active users may result in more radio resource utilization. Hence, the CU event-based trigger of periodic reports is not sufficient.

Instead, an event-based trigger from a DU may be used to trigger any periodic resource status report from a CU. The event-based trigger from the DU may indicate a composite available capacity-based notification which may then enable the CU to trigger more detailed periodic reports from the DU. The CU may trigger the specific detailed reports of specific attributes based on the use case that CU is interested. Currently, gNB-DU based triggers are not supported in a resource status reporting procedure.

Example embodiments of the present disclosure propose a resource status indication scheme. With this scheme, a resource status request for resource group(s) may be received by a first apparatus from a second apparatus, and a resource status indication for the resource group(s) may be transmitted to the second apparatus from the first apparatus.

In this way, a "resource group" level event-based reporting may be used to trigger additional report requests or to decide subsequent actions. Per-resource (e.g., per cell or per-ssb-area) reporting may have disadvantages like high reporting rates, inability to take decisions keeping a high-level view, and/or the like. These issues can be overcome by defining resource groups which may reduce the reporting load and enable the capability of taking decisions based on composite metrics. This scheme enables localized monitoring, thereby reducing the signaling overhead.

By way of example, a power saving group (PSG) in a Network Energy Saving (NES) use case may denote a group of cells (as an example of a resource group) whose aggregate load needs to be monitored to trigger NES actions. When the composite load in the PSG goes below a threshold, cells may be deactivated in the configured order. Similarly, when the composite load in the PSG goes above a threshold, cells may be activated back. As such, resource-group based metrics may be reported from the first apparatus to the second apparatus which will enable cell activation or deactivation by the second apparatus while more autonomy may be given to the first apparatus.

FIG. 1A illustrates an example communication environment 100 in which example embodiments of the present disclosure can be implemented. In the communication environment 100, a first apparatus 110 and a second apparatus 120 can communicate with each other. In some example embodiments, the first apparatus 110 may be a distributed unit (DU) of a network device. The second apparatus 120 may be a centralized unit (CU) of the network device. The first apparatus 110 and/or the second apparatus 120 may serve one or more coverage areas, called cells, which may be provided on one or more carriers.

In the following, for the purpose of illustration, some example embodiments are described with the first apparatus 110 operating as a DU of a network device (such as a gNB) and the second apparatus 120 operating as a CU of the network device. In these example embodiments, the first and second apparatuses 110 and 120 may communicate with an F1AP interface. However, in some example embodiments, operations described in connection with the DU and CU of the network device may be implemented at other devices. For example, in some example embodiments, the first apparatus 110 may operate as a user plane (UP) of a CU such as a gNB-CU-UP, and the second apparatus 120 may operate as a control plane of the CU such as a gNB-CU-CP. In this case, the first and second apparatuses 110 and 120 may communicate with an E1 or E1AP interface. In some example embodiments, the first and second apparatuses 110 and 120 may operate as two base stations communicating via an Xn interface. In some other example embodiments, the first apparatus 110 may operate as a base station, and the second apparatus 120 may operate as a network device in a core network such as 5G core (5GC). The first and second apparatuses 110 and 120 may communicate via an NG interface.

In some example embodiments, a third apparatus 130 may be also deployed in the communication environment 100 to communicate with the first apparatus 110 and the second apparatus 120. The first and second apparatuses 110 and 120 and the third apparatus 130 may be applied in NSA and NR-DC deployments. In an example, the first and second apparatuses 110 and 120 may operate as a DU and a CU of a gNB respective, and the third apparatus 130 may operate as a master eNB (MeNB).

Communications in the communication environment 100 may be implemented in a wired or wireless way according to any communication protocol and communication technology currently known or to be developed in the future. It is to be understood that the number of devices and their connections shown in FIG. 1A are only for the purpose of illustration without suggesting any limitation. For example, the first and second apparatuses 110 and 120 are shown to be separate from each other only for illustration. In some example embodiments, the two apparatuses 110 and 120 (such as a DU and a CU) may be integrated into a physical entity (such as a base station). In addition, the communication environment 100 may include any suitable number of devices configured to implement example embodiments of the present disclosure. In some example embodiments, there may be a plurality of DUs communicating with a CU within a network device.

NES features in 5G RAN may be supported in the communication environment 100. For example, cell (component carrier) switch-off for Energy Efficiency may be enabled. Traffic load key performance indicators (KPIs) such as downlink (DL) physical resource block (PRB) utilization of a physical downlink control channel (PDCCH) and a physical downlink shared channel (PDSCH)) may be monitored to trigger cell activation or de-activation. Cell shutdown may support stepwise power ramp down to enable handover of a terminal device such as a UE before the cell shutdown. The NES features may be enabled in both standalone (SA) and non-standalone (NSA) deployment.

"DU Autonomy for NES" may be allowed. Cells in a power saving group may be within a given DU. Load KPI monitoring is implemented in a DU instead of a CU. Cell switch-on and switch-off may be triggered from a DU itself. F1 or F1AP messages may be used to notify the cell switch-on/switch-off status from a DU to a CU. In the NSA deployment such as NSA-3x, the CU may notify cell-status (de-activation) to an MeNB, and the MeNB may trigger cell activation whenever needed.

In some example embodiments, in the communication environment 100, resource status reporting is enabled between the first and second apparatuses 110 and 120 for an NES use case. Example processes of the resource status reporting will be discussed below with reference to FIGS. 1B and 1C. In these examples, the first apparatus 110 may operate as a DU of a gNB, and the second apparatus 120 may operate as a CU of the gNB.

Figure 1B:
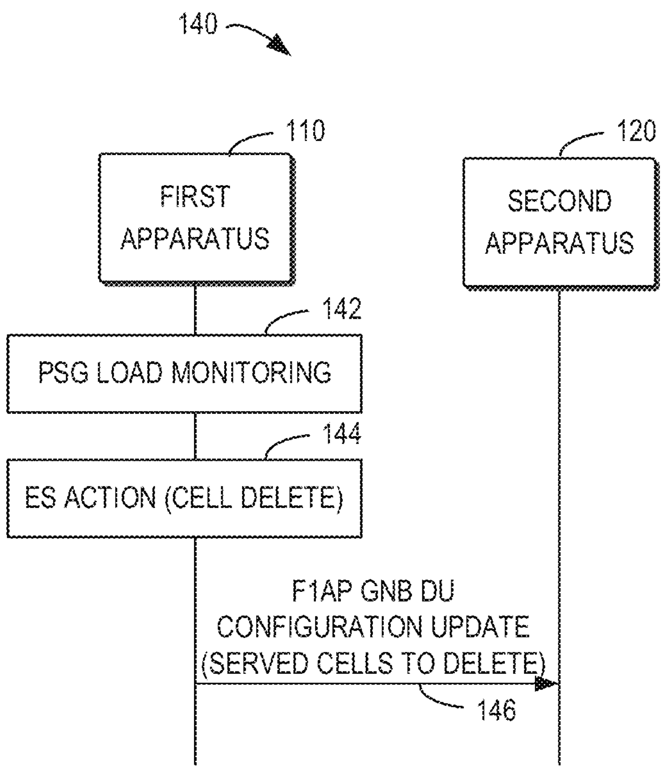
FIG. 1B illustrates a flow chart of an example process of cell level network energy saving.

FIG. 1B illustrates a flow chart of an example process 140 of cell level network energy saving.

As shown in FIG. 1B, at 142, the first apparatus 110 may monitor the load in a PSG which may denote a list of cell(s). The first apparatus 110 may decide to activate/deactivate the cell(s), for example depending on a threshold, and decide a corresponding energy saving (ES) action of cell addition/deletion. In an example, at 144 the first apparatus 110 decides the ES action to be cell deletion. At 146, the first apparatus 110 may send a gNB-DU configuration update message via an F1AP interface (or "F1AP") to the second apparatus 120 to report that the served cell(s) is to be deleted.

In this process 140, the first apparatus 110 may activate/deactivate the cell(s) and only the ES action of cell addition/deletion is notified from the first apparatus 110 to the second apparatus 120. This process 140 may be implemented for base transceiver station (BTS) for standalone (SA) deployments.

Figure 1C:
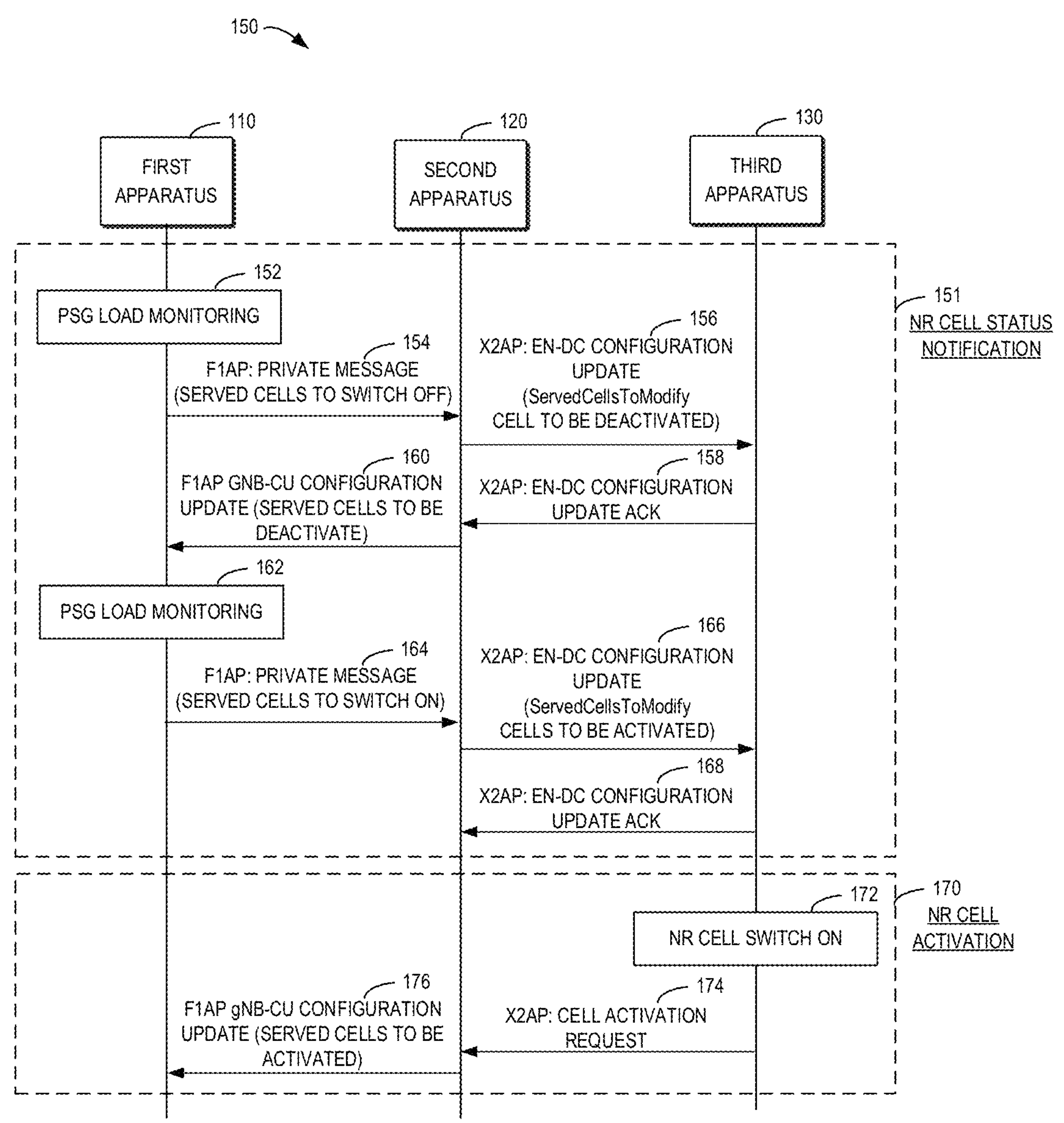
FIG. 1C illustrates a flow chart of another example process of cell level network energy saving.

FIG. 1C illustrates a flow chart of another example process 150 of cell level network energy saving. In this example, the third apparatus 130 may operate as another network device, for example a MeNB for supporting the NSA deployment. In this deployment, load monitoring in Power Saving Group may reused and a notification about cell activation/de-activation is sent to the third apparatus 130.

In an NR cell status notification stage 151, at 152, the first apparatus 110 may monitor the load in the PSG which may denote a list of cell(s). Then the first apparatus 110 may send a private message via the F1AP interface to the second apparatus 120 to notify that the cell(s) is to be switched on or switched off. For example, at 154, the first apparatus 110 send a private message to report to the second apparatus 120 that the cell(s) to be switched off. At 156, the second apparatus 120 may send an Evolved-Universal Mobile Telecommunications System (UMTS) Terrestrial Radio Access (EUTRA)-NR dual connection configuration (EN-DC) update message (for example, ServedCellstoModify) via an X2AP interface or other XnAP interface to the third apparatus 130 to notify that the cell(s) is to be deactivated. Then, at 158, the third apparatus 130 may send an EN-DC configuration update acknowledgement message via the X2AP interface to the second apparatus 120. At 160, the second apparatus 120 may send a gNB-CU configuration update message via F1AP to the first apparatus 110 to indicate that the served cell(s) is to be deactivated.

At 162, the first apparatus 110 may continue to monitor the load of PSG. At 164, the first apparatus 110 may transmit an F1AP private message to the second apparatus 120 to report that the served cell(s) is to be switched on. At 166, the second apparatus 120 may transmit an EN-DC configuration update message (for example, ServedCellstoModify) to the third apparatus 130 to notify that the cell(s) is to be activated. At 168, the third apparatus 130 may transmit an EN-DC configuration update acknowledgement message to the second apparatus 120.

In an NR cell activation stage 170, at 172, the third apparatus 130 may switch on the NR cell. At 174, the third apparatus 130 may transmit an X2AP cell activation request to the second apparatus 120. At 176, the second apparatus 120 may transmit a gNB-CU configuration update message via F1AP to the first apparatus 110 to indicate that the served cell(s) is to be activated.

According to example embodiments of the present disclosure, resource group-based reporting is enabled in the communication environment 100. Some example implementations will be discussed below with reference to FIGS. 2 to 5.

Figure 2:
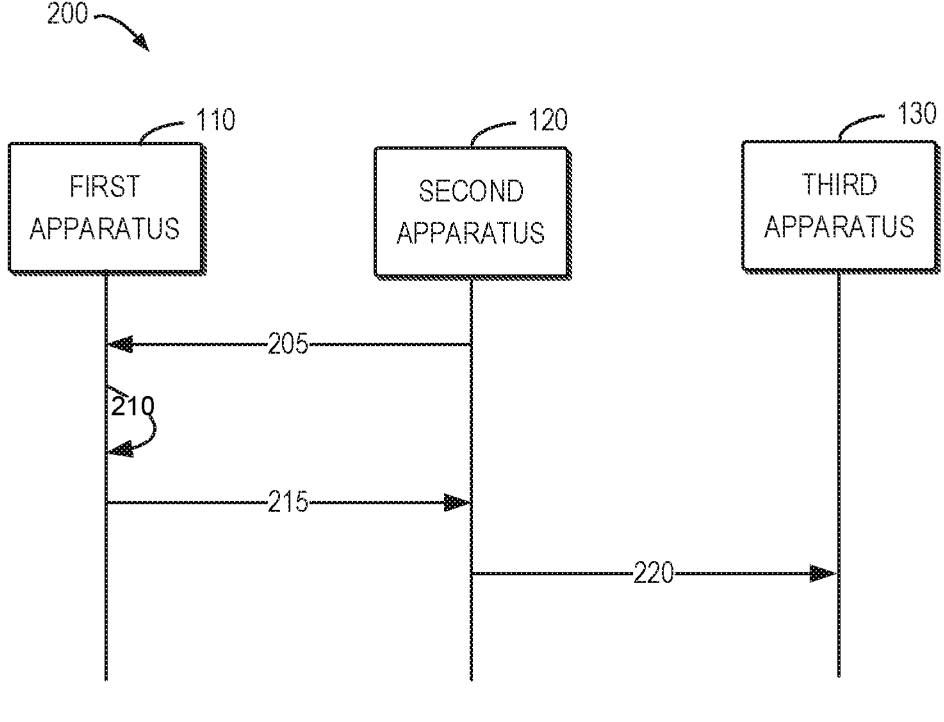
FIG. 2 illustrates a signaling diagram for an example communication process in the communication environment according to some example embodiments of the present disclosure.

FIG. 2 illustrates a signaling diagram for an example communication process 200 in the communication environment 100 according to some example embodiments of the present disclosure.

As shown in FIG. 2, the second apparatus 120 may transmit (205) a resource status request for at least one resource group to the first apparatus 110. Accordingly, the first apparatus 120 may receive the resource status request for the at least one resource group from the second apparatus 120. The resource group may comprise any type of resource groups, for example, including a group of cells, a group of beams, a group of Multiple-Input Multiple-Output (MIMO) layers, a group of network slices, a group of data radio bearers (DRBs), a group of centralized unit user plane (CUUP) instances, a group of quality-of-service (QoS) identifiers such as 5QIs, a group of transport network layer associations (TNLAs), and/or any combination thereof.

For example, in the example embodiments where the first apparatus 110 operates as a DU of a network device and the second apparatus 120 operates as a CU of the network device, the resource group may comprise a group of cells, a group of beams and/or a group of MIMO layers. In the example embodiments where the first apparatus 110 operates as a network device in a next generation (NG)-RAN and the second apparatus 120 operates as a network device in 5GC, the resource group may comprise a group of 5QIs, a group of network slices and/or a group of TNLAs such as a set of stream control transmission protocol (SCTP) connections between the NG-RAN and an access and mobility management function (AMF). In the example embodiments where the first apparatus 110 operates as a gNB-CU-UP and the second apparatus 120 operates as a gNB-CU-CP, the resource group may comprise a group of DRBs for a given UE, a group of all DRBs in a given network slice, and/or a group of all DRBs in a CUUP instance. The resource group may be also defined based on other attributes, for example, which may be the use case relevant.

The at least one resource group may be configured through Operations, Administration and Maintenance (OAM). In an example, the resource group may be configured for the first apparatus 110. In some example embodiments, the first apparatus 110 may obtain a resource group configuration corresponding to the at least one resource group. The resource group configuration may include at least one of: a configuration for at least one type of configured resource groups, a configuration for at least one monitoring condition associated with at least one event for the at least one type of configured resource groups, or a configuration for reporting, in response to the at least one monitoring condition being met, a resource status indication that the at least one event is detected. In some example embodiments, the first apparatus 110 may transmit the resource group configuration to the second apparatus 120. Accordingly, the second apparatus 120 may receive the resource group configuration from the first apparatus 110. In some other example embodiments, the resource group configuration may be configured for the second apparatus 120 through OAM.

In some example embodiments, the second apparatus 120 may subscribe to the first apparatus 110 about a specific attribute and granularity that the second apparatus 120 may interested in. In an example, the resource status request may comprise a subscription to at least one of: a report of at least one event associated with a type of configured resource groups, or a report of at least one event associated with a subset of configured resource groups among the type of configured resource groups. Using the resource status request, the second apparatus 120 may be enabled to subscribe to a notification at the requested resource group level. For example, the second apparatus 120 may subscribe to cell level groups to enable reception of notification and accordingly trigger cell activation/deactivation. Beam level decisions may then be left to the first apparatus 110.

In some example embodiments, an information element (IE) resource-event-notification-control with ENUM {Power Saving Cell Group} may be used to indicate lower layer ES granularities such as MIMO Muting etc. The IE may be included in a resource status request via the F1AP interface or other interfaces (such as E1, E1AP, Xn and NG interfaces) or in a specific F1AP, E1, Xn and/or NG message.

By way of example, in some example embodiments (referred to as Option 1), all events for all configured resource groups may be configured through OAM in the first apparatus 110, and cell activation/deactivation order/preferences may be configured through OAM in the second apparatus 120. In this case, the second apparatus 120 may only select a scope of the resource group, for example all events corresponding to the cell level resource groups.

In some example embodiments (referred to as Option 2), the resource group and event configuration may be configured through OAM both in the first apparatus 110 and the second apparatus 120. The cell activation/deactivation order/preferences may be configured through OAM in the second apparatus 120. In Option 2, the second apparatus 120 may select the specific resource groups and events to be reported by the first apparatus 110.

In some example embodiments (referred to as Option 3), the resource group and event configuration may be configured through OAM in the first apparatus 110. The resource group and event configuration may be sent to the second apparatus 120 using a F1AP procedure. The cell activation/deactivation order/preferences may be configured through OAM in the second apparatus 120. The resource group and event configuration and the cell activation/deactivation order/preferences may be included in the existing F1 setup procedure or a gNB-DU configuration update procedure that may be enhanced. Similar to Option 2, Option 3 allows the second apparatus 120 to select the specific resource groups and events to be reported by the first apparatus 110.

Both Options 2 and 3 may enable more flexibility at the second apparatus 120 since it can request events from only specific resource groups of a given scope (such as a cell level). For example, even if there are multiple cell level resource groups configured in the first apparatus 110, the second apparatus 120 may request event reporting only from a subset. This subset may be selected based on an operator configuration/preference. Options 2 and 3 may solve the same issue through different means. Option 2 leverages OAM based configuration at the second apparatus 120 while Option 3 uses F1AP based exchange.

In some example embodiments, after the first apparatus 110 receives the resource status request, the first apparatus 110 may send an acknowledgement to the second apparatus 120 to indicate that the resource status request is received. Then, as shown in FIG. 2, the first apparatus 110 may monitor (210) for at least one event associated with the at least one resource group. In some example embodiments, the first apparatus 110 may detect whether at least one monitoring condition associated with the at least one event is met for the at least one resource group.

In some example embodiments, the monitoring condition may be configured through the OAM. In some example embodiments, in the NES use case, the condition may be configured as PRB utilization, and the corresponding high and low thresholds (referred to as a first threshold and a second threshold, respectively) are also configured. In a case of cell level NES, a group of cells (denoted by a PSG) is relevant. For example, the first apparatus 110 may detect whether PRB utilization of a PSG increases above the first threshold (e.g., a higher threshold), and/or whether PRB utilization of a PSG decreases below the second threshold (e.g., a lower threshold). In some example embodiments, one threshold may be used, for example, the first and second thresholds may be the same.

In some example embodiments, based on the monitoring (210), the first apparatus 110 may transmit (215) a resource status indication for the at least one resource group to the second apparatus 120. Accordingly, the second apparatus 120 may receive the resource status indication for the at least one resource group from the first apparatus 110.

In some example embodiments, if an event of the at least one event is detected for a resource group of the at least one resource group, the first apparatus 110 may transmit the resource status indication that the event is detected for the resource group to the second apparatus 120. In some example embodiments, after receiving the resource status indication that the event is detected for the resource group, the second apparatus 120 may trigger a periodic report from the first apparatus 110. For example, the second apparatus 120 may transmit a request for a periodic report of a resource status indication for individual resources included in the resource group to the first apparatus 110. Further, the second apparatus 120 may trigger subsequent actions.

In some example embodiments, after the first apparatus 110 transmits the resource status indication to the second apparatus 120, the first apparatus 110 may receive an indication that a resource in the at least one resource group is to be deactivated or activated from the second apparatus 120. In some example embodiments, in the case of NR-DC deployments or NSA deployments, the third apparatus 130 or other apparatuses such as another NR RAN node may take the role of a master node and trigger the subsequent actions. In an example, as shown in FIG. 2, the second apparatus 120 may transmit (220) a request to the third apparatus 130 that a resource in the at least one resource group is to be deactivated or activated. Then, the third apparatus 130 may make and enable the decision.

By way of example, in the NES use case where the monitoring condition may be configured as PRB utilization and the first and second thresholds are used as described above, in a case where PRB utilization of a PSG increases above the first threshold, the first apparatus 110 may notify the second apparatus 120. The second apparatus 120 optionally may trigger a periodic report from the first apparatus 110, and the second apparatus 120 may then trigger a cell activation. In a case where PRB utilization of the PSG decreases below the second threshold, the first apparatus 110 may notify the second apparatus 120. The second apparatus 110 optionally can trigger a periodic report from the first apparatus 110, and the second apparatus 120 may trigger cell deactivation.

In some example embodiments, in response to absence of the event for the resource group, for example, if the event cannot be detected any more, the first apparatus 110 may transmit a further resource status indication that the event is resolved to the second apparatus 120. Then, the second apparatus 120 may know that the event is resolved.

In some example embodiments, an IE Resource-event-notify with ENUM {detected, resolved} may be used by the first apparatus 110 to report specific events (based on OAM configured parameters e.g., resource groups, load monitoring criteria, and/or the like) at a resource group or resource level (such as cell group, cell, and/or beam level). The IE may be included in any suitable message. In the example embodiments where the first apparatus 110 operates as a DU of a gNB and the second apparatus 120 operates as a CU of the gNB, a F1AP procedure or a F1AP message may be defined to notify the status at resource group level (which may be event based). Alternatively, or in addition, a resource status update message via F1AP, or a gNB-DU overload indication may be reused.

Some example processes in a cell-level NES use case will be discussed below with reference to FIGS. 3 to 5. In these examples, the first apparatus 110 may operate as a DU of a gNB (or a gNB-DU) 302, and the second apparatus 120 may operate as a CU of the gNB (or a gNB-CU) 304.

Figure 3:
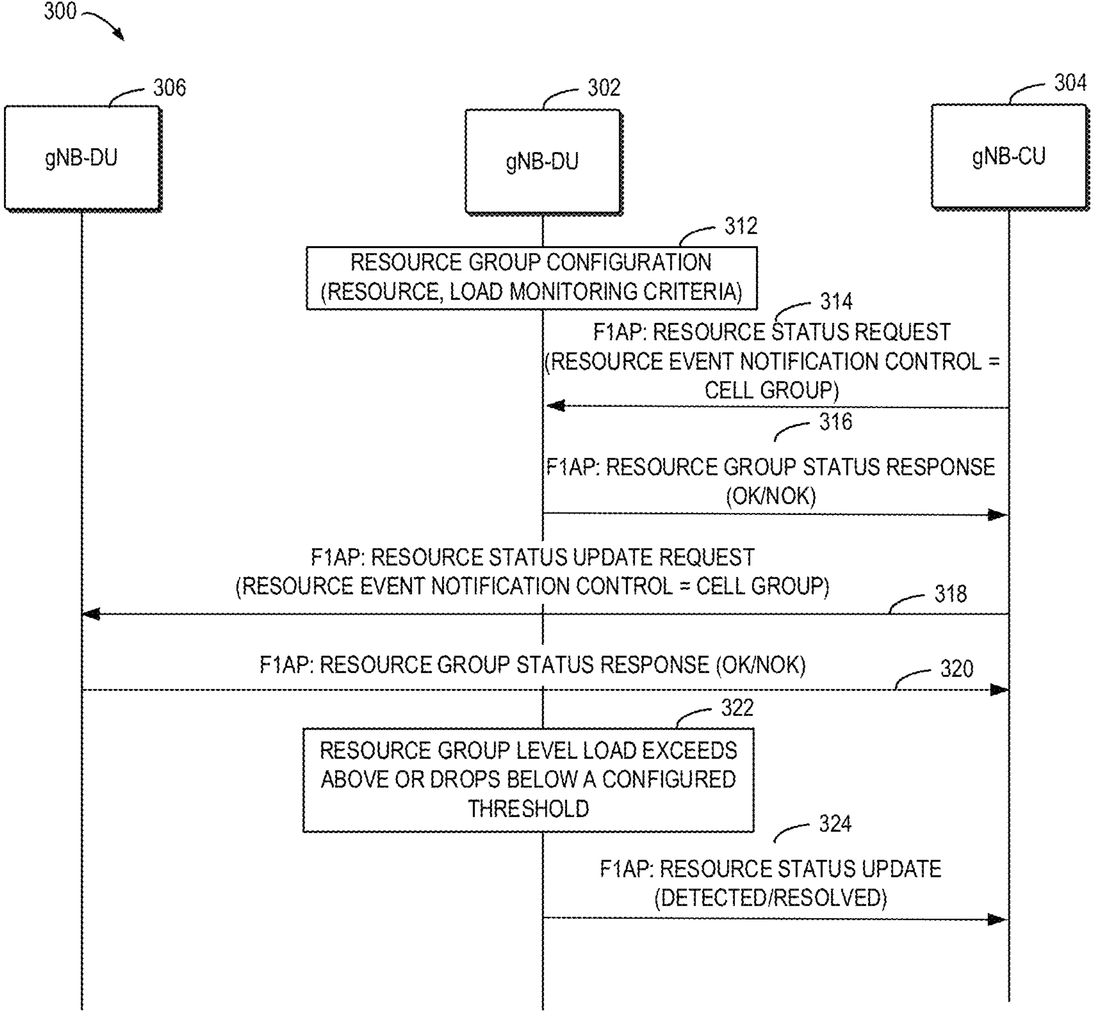
FIG. 3 illustrates an example framework of resource group-based reporting in accordance with some example embodiments of the present disclosure.

Reference is first made to FIG. 3 which illustrates an example framework 300 of resource group-based reporting in accordance with some example embodiments of the present disclosure. In this example, another gNB-DU 306 is deployed.

As shown in FIG. 3, at 312, the resource groups themselves and the monitoring conditions (such as load monitoring criteria) are configured by OAM in the gNB-DU 302. The resource group can be a "set of cells" or "set of beams". At 314, the gNB-CU 304 may transmit an F1AP resource status request to the gNB-DU 302 to request a reporting of the resource group status. For example, if the resource status request of the gNB-CU 304 is about a certain cell group, then the gNB-CU 304 may set the resource event notification control to be the certain cell group.

At 316, the gNB-DU 302 may send an acknowledgement (such as F1AP resource group status response) to the gNB-CU 304. If the resource status request is received, the gNB-DU 302 may send an acknowledgement (such as OK) to indicate that the resource status request is received; otherwise, the gNB-DU 302 may send an acknowledgement (such as NOK) to indicate that there is something wrong about the resource status request, for example, a resource status request is not received for a while.

At 318, the gNB-CU 304 may also transmit to the gNB-DU 306 an F1AP resource status update request with the resource event notification control directed to the cell group. At 320, the gNB-DU 306 may send an acknowledgement (such as F1AP resource group status response of OK/NOK) to the gNB-CU 304.

Both the gNB-DU 302 and the gNB-DU 306 may start the resource group monitoring. The monitoring condition may be configured through OAM at 312. For example, the condition may be configured as PRB utilization, and the corresponding first (e.g., high) and second (e.g., low) thresholds are also configured. In an example, the first and second thresholds may be also the same. Accordingly, at 322, the gNB-DU 302 may determine whether the load of the type of configured resource group exceeds or drops below the configured threshold. When the condition is met, the gNB-DU 302 may notify the gNB-CU 304 using the F1AP resource group status indication. As shown in FIG. 3, at 324, the gNB-DU 302 may send an F1AP resource status update (to indicate a detected/resolved event) to the gNB-CU 304.

The gNB-CU 304 may optionally trigger a periodic resource status report per cell using the legacy F1AP resource status request/response/update procedures. The gNB-CU 304 may consider the resource group status across multiple gNB-DUs and may trigger the F1AP resource group configuration update procedure to activate or deactivate the resource. This may be realized using the F1AP procedures such as the gNB-CU configuration update to activate or deactivation cell(s) or a specified procedure may be introduced.

This framework 300 enables localized monitoring in a gNB-DU thereby reducing the signaling overhead over F1AP interfaces. The resource group based notification from a gNB-DU serves as an optimum point for a gNB-CU to collect per-resource (e.g., cell, beam and/or the like) status report and also make any optimum decisions.

In some example embodiments, in the case of new radio-dual connectivity (NR-DC) deployments, another NR RAN node such as a MeNB may take the role of the master node and trigger the NES action. Some example embodiments in the regard will be described below with reference to FIGS. 4A and 4B.

Figure 4A:
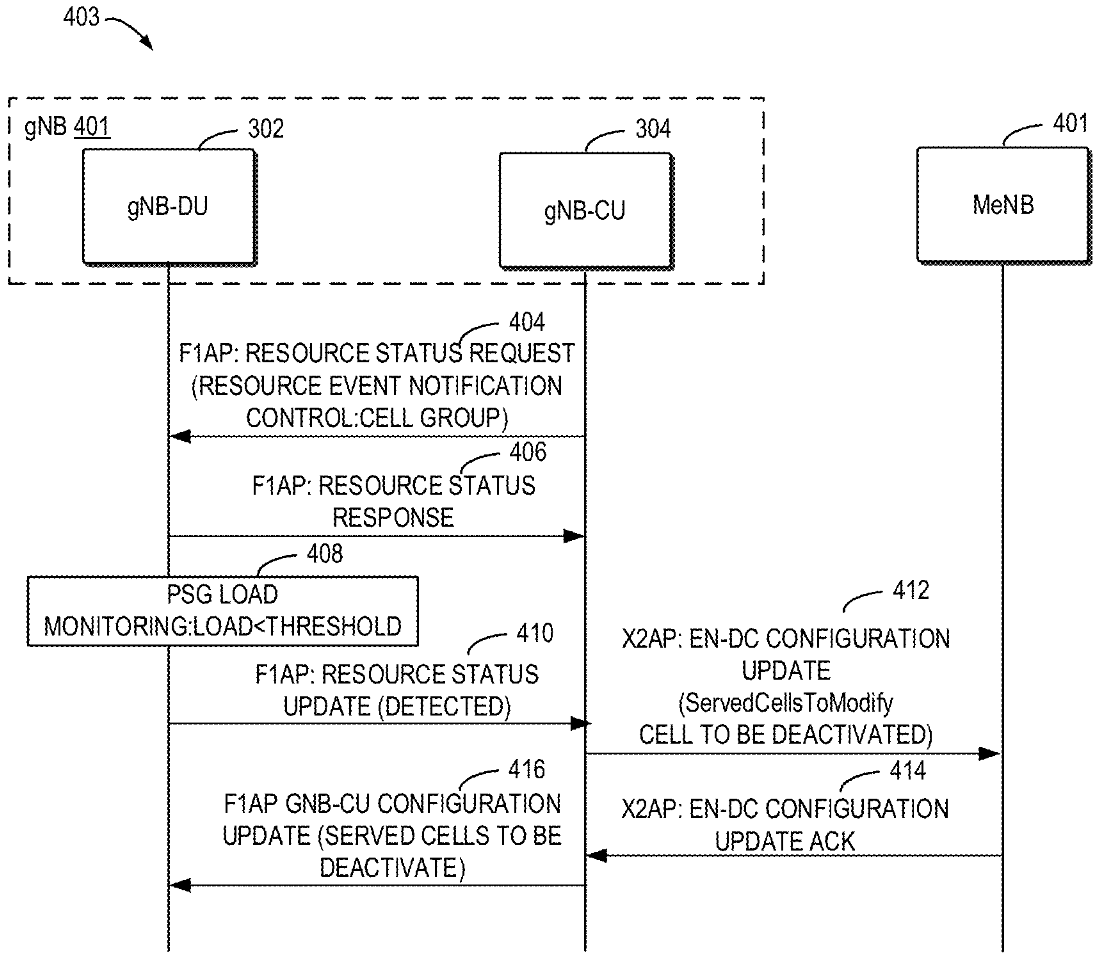
FIGS. 4A and 4B illustrate example processes of resource group-based reporting in non-standalone (NSA) deployments with the framework in accordance with some example embodiments of the present disclosure.
Figure 4B:
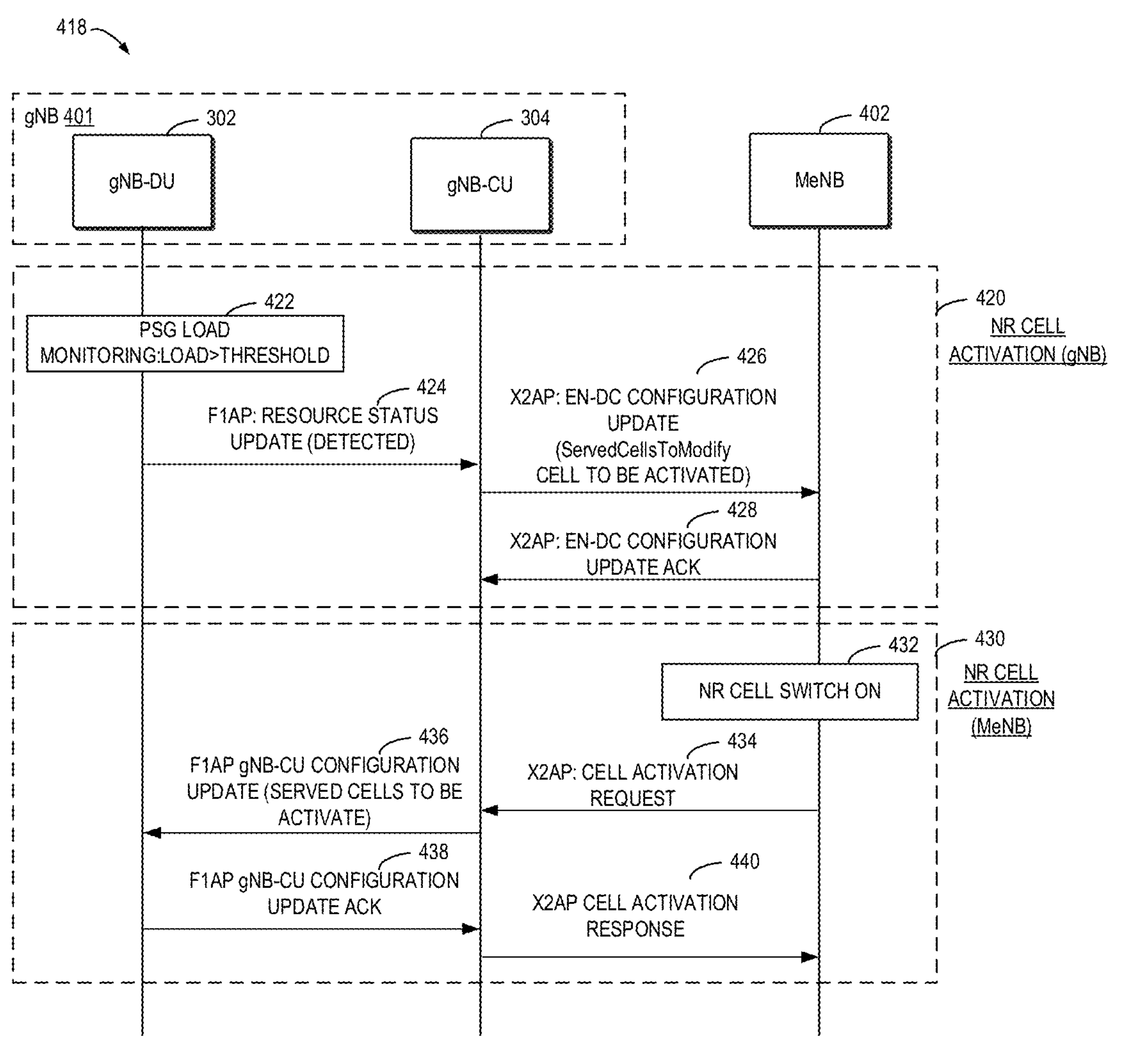

FIGS. 4A and 4B illustrates example processes of resource group-based reporting in NSA deployments with the framework 300 in accordance with some example embodiments of the present disclosure. In these examples, the first and second apparatuses 110 and 120 may operate as the gNB-DU 302 and the gNB-CU 304 of a gNB 401, and the third apparatus 130 may operate as an MeNB 402. In this case, a resource group notification may be configured as "cell level", and the third apparatus 130 may trigger the cell level actions reusing the XnAP (such as X2AP) procedures.

As shown in FIG. 4A, in a process 403, at 404, the gNB-CU 304 may transmit to the gNB-DU 302 an F1AP resource status request including the resource event notification corresponding to a cell group. At 406, the gNB-DU 302 may send a resource status response to the gNB-CU 304. At 408, the gNB-DU 302 may determine that the load of the PSG exceeds a configured threshold. At 410, the gNB-DU 302 may transmit an F1AP resource status update (to indicate a detected event) to the gNB-CU 304. At 412, the gNB-CU 304 may transmit an EN-DC configuration update (for example, ServedCellstoModify to indicate a cell to be deactivated) to the MeNB 402 via X2AP. At 414, the MeNB 402 may transmit an EN-DC configuration update acknowledgment to the gNB-CU 304 via X2AP. At 416, the gNB-CU 304 may transmit an F1AP gNB-CU 304 configuration update (for example, to indicate that served cells are to be deactivated) to the gNB-DU 302.

A process 418 as shown in FIG. 4B involves cell activation. In a NR cell activation stage 420 at the gNB 401, at 422, the gNB-DU 302 may determine that the load of the PSG drops below the configured threshold. At 424, the gNB-DU 302 may transmit an F1AP resource status update (to indicate a detected event) to the gNB-CU 304. At 426, the gNB-CU 304 may transmit an EN-DC configuration update (for example, ServedCellstoModify to indicate a cell to be activated) to the MeNB 402 via X2AP. At 428, the MeNB 402 may transmit an EN-DC configuration update acknowledgment to the gNB-CU 304 via X2AP.

In a NR cell activation stage 430 at the MeNB 402, at 432, the MeNB 402 may switch on the served cell. At 434, the MeNB 402 may transmit an X2AP cell activation request to the gNB-CU 304. At 436, the gNB-CU 304 may transmit a gNB-CU configuration update (for example, to indicate that served cells are to be activated) to the gNB-DU 302 via F1AP. At 438, the gNB-DU 302 may transmit a gNB-CU configuration update acknowledgement to the gNB-CU 304 via F1AP. At 440, the gNB-CU 304 may transmit XnAP cell activation response to the MeNB 402.

In some example embodiments, the framework 300 as shown in FIG. 3 may also be applicable in SA deployment in which case the gNB-CU 304 itself is responsible to trigger the NES Action. Some example embodiments in this regard will be discussed below with reference to FIG. 5.

Figure 5:
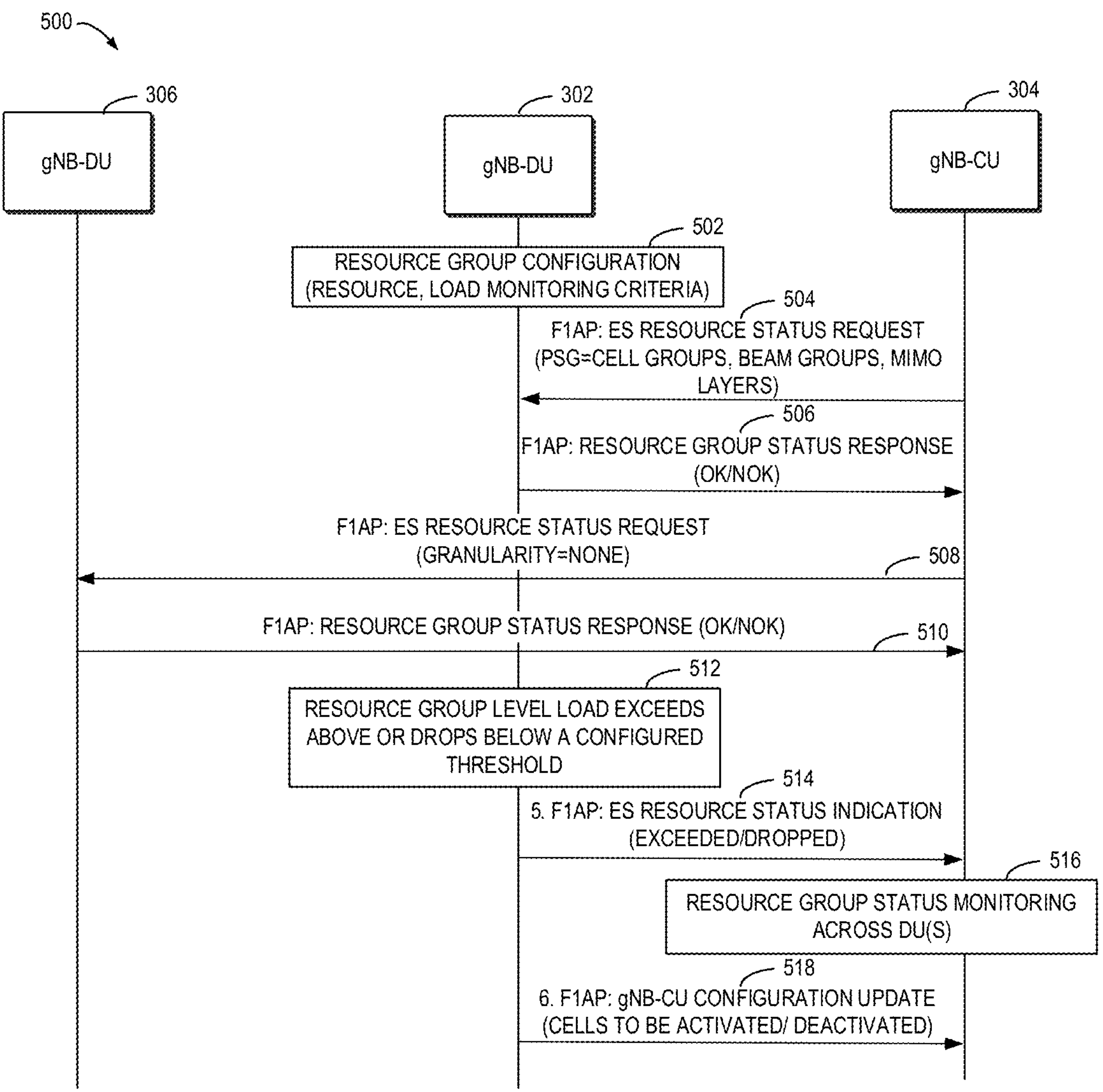
FIG. 5 illustrates an example process 500 of resource group-based reporting in standalone (SA) deployments with the framework in accordance with some example embodiments of the present disclosure.

FIG. 5 illustrates an example process 500 of resource group-based reporting in the SA deployment with the framework 300 in accordance with some example embodiments of the present disclosure.

At 502, the gNB-DU 302 may obtain a resource group configuration. At 504, the gNB-CU 304 may transmit an F1AP ES resource status request to the gNB-DU 302 to request a reporting of the resource group status. At 506, the gNB-CU 304 may send an F1AP resource group status response (such as OK/NOK) to the gNB-DU 302. At 508, the gNB-CU 304 may transmit an F1AP ES resource status request (with granularity equal to none) to the gNB-DU 306. At 510, the gNB-DU 306 send an F1AP resource group status response (such as OK/NOK) to the gNB-CU 304. Accordingly, the gNB-DU 306 may perform legacy resource status reporting per resource.

At 512, the gNB-DU 302 may determine that the load of the resource group level exceeds or drops below the configured threshold. At 514, the gNB-DU 302 may transmit an F1AP ES resource status indication (to indicate an exceeded/dropped event) to the gNB-CU 304. At 516, the gNB-CU 304 may monitor the resource group status across a plurality of DUs. At 518, the gNB-DU 302 may transmit a gNB-CU configuration update (for example, to indicate cells to be activated/deactivated) to the gNB-CU 304 via F1AP.

This framework 300 as shown in FIG. 3 is applicable in Cloud-RAN deployment as well in which case the gNB-CU 304 may request the resource group status from one or more gNB-DUs before deciding the NES action. The gNB-CU 304 may switch between different granularity of resource status requests. For example, when the energy saving is OFF, the gNB-CU 304 may request the resource group status report at a "cell group level". If some lower granular NES action is activated (for example, some beams are deactivated), the gNB-CU 304 may request the resource group status report at a "beam group level".

In some example embodiments, it is not necessary that an implementation has to expose all granularities of resource groups to the gNB-CU 304, and it is possible not to expose the lower granular resource group status (for example, a MIMO layer level) to the gNB-CU 304.

Artificial intelligence and machine learning (AIML) in NG-RAN is enabled in a split architecture in Release-19. In some example embodiments, such a framework may enable an evolution of the statistics-based notification to an ML model-based approach in the first apparatus 110.

For example, when the RAN node is equipped with embedded ML model(s) for the NES use case, the ML model may be trained using the data collection and training at the first apparatus 110. After the training is complete, the ML model inference may be used to trigger the notification to the second apparatus 120 indicating a future time at which the load is expected to exceed or drop. Such a notification may then enable the second apparatus 120 to identify the appropriate NES actions that have to be triggered. F1AP AIML information update may be reused and is sent when specific events are met. Thus, the resource group concept may be also aligned with the co-location principle (for example, data collection & training) at the first apparatus 110.

Example Methods

Figure 6:
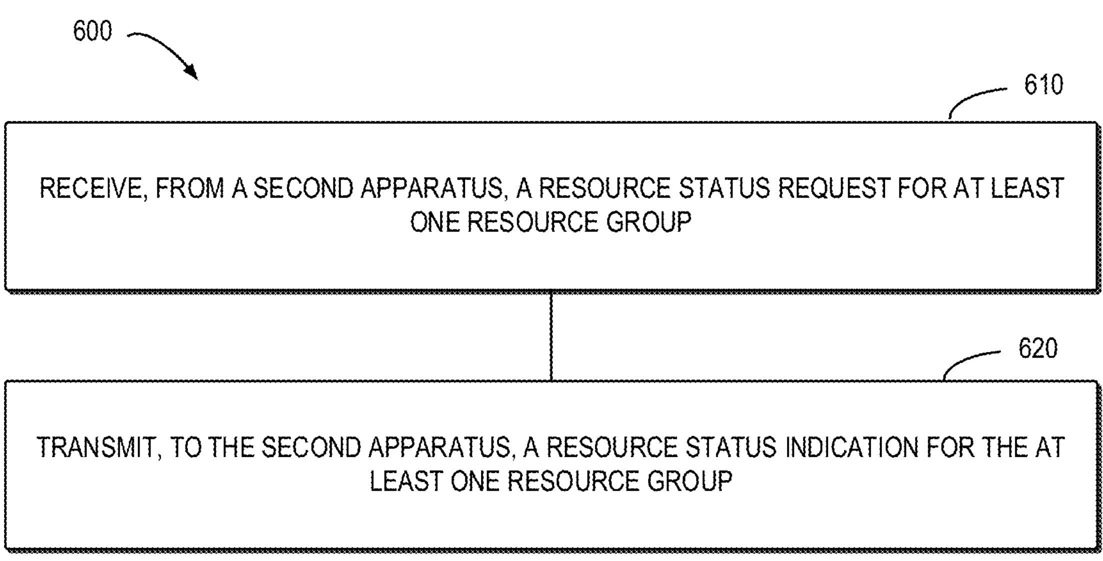
FIG. 6 illustrates a flow chart of an example method of resource status reporting in accordance with some example embodiments of the present disclosure.

FIG. 6 shows a flowchart of an example method 600 of resource status reporting in accordance with some example embodiments of the present disclosure. The method 600 can be implemented at the first apparatus as shown in FIG. 1A. For the purpose of discussion, the method 600 will be described from the perspective of the first apparatus 110 with reference to in FIG. 1A.

At block 610, the first apparatus 110 receives, from the second apparatus 120, a resource status request for at least one resource group. At block 620, the first apparatus 110 transmits, to the second apparatus 120, a resource status indication for the at least one resource group.

In some example embodiments, in response to receiving the resource status request, the first apparatus 110 may monitor for at least one event associated with the at least one resource group.

In some example embodiments, the monitoring may comprise detecting whether at least one monitoring condition associated with the at least one event is met for the at least one resource group.

In some example embodiments, in response to an event of the at least one event being detected for a resource group of the at least one resource group, the first apparatus 110 may transmit, to the second apparatus 120, the resource status indication that the event detected for the resource group.

In some example embodiments, in response to absence of the event for the resource group, the first apparatus 110 may transmit, to the second apparatus 120, a further resource status indication that the event is resolved.

In some example embodiments, the first apparatus 110 may further obtain a resource group configuration including at least one of: a configuration for at least one type of configured resource groups, a configuration for at least one monitoring condition associated with at least one event for the at least one type of configured resource groups, or a configuration for reporting, in response to the at least one monitoring condition being met, a resource status indication that the at least one event is detected.

In some example embodiments, the resource group configuration may be configured for the first apparatus 110 through operation administration and maintenance.

In some example embodiments, the first apparatus 110 may further transmit the resource group configuration to the second apparatus 120.

In some example embodiments, the resource status request may comprise a subscription to at least one of: a report of at least one event associated with a type of configured resource groups, or a report of at least one event associated with a subset of configured resource groups among the type of configured resource groups.

In some example embodiments, after transmitting the resource status indication, the first apparatus 110 may receive, from the second apparatus 120, an indication that a resource in the at least one resource group is to be deactivated or activated.

In some example embodiments, the resource group may comprise at least one of: a group of cells, a group of beams, a group of network slices, a group of Multiple-Input Multiple-Output layers, a group of data radio bearers, a group of centralized unit user plane instances, a group of quality of service identifiers, or a group of transport network layer associations.

In some example embodiments, at least one of the resource status request or the resource status indication for the at least one resource group may be communicated in at least one of an F1AP message, an E1 message, an Xn message or an NG message.

In some example embodiments, the first apparatus 110 may comprise a distributed unit of a network device, and the second apparatus 120 may comprise a central unit of the network device.

Figure 7:
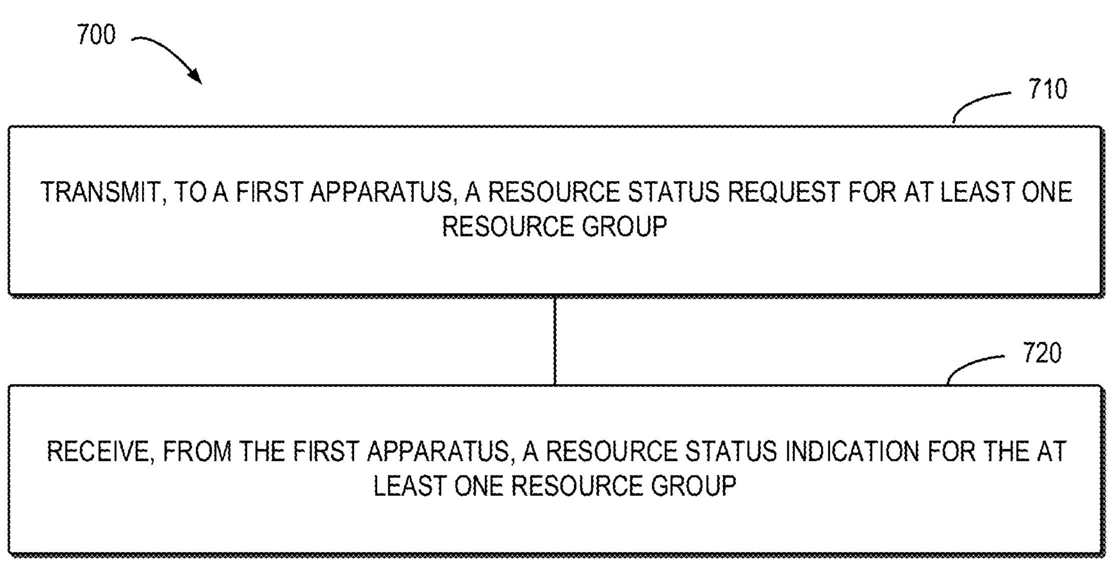
FIG. 7 illustrates a flow chart of another example method of resource status reporting in accordance with some example embodiments of the present disclosure.

FIG. 7 shows a flowchart of another example method 700 of resource status reporting in accordance with some example embodiments of the present disclosure. The method 700 can be implemented at the second apparatus 120 as shown in FIG. 1A. For the purpose of discussion, the method 700 will be described from the perspective of the second apparatus 120 with reference to FIG. 1A.

At block 710, the second apparatus 120 transmits, to the first apparatus 110, a resource status request for at least one resource group. At block 720, the second apparatus 120 receives, from the first apparatus 110, a resource status indication for the at least one resource group.

In some example embodiments, the second apparatus 120 may further obtain a resource group configuration including at least one of: a configuration for at least one type of configured resource groups, a configuration for at least one monitoring condition associated with at least one event for the at least one type of configured resource groups, or a configuration for reporting, in response to the at least one monitoring condition being met, a resource status indication that the at least one event is detected.

In some example embodiments, the resource group configuration may be configured for the second apparatus 120 through operation administration and maintenance.

In some example embodiments, the second apparatus 120 may further receive the resource group configuration from the first apparatus.

In some example embodiments, the resource status request may comprise a subscription to at least one of: a report of at least one event associated with a type of configured resource groups, or a report of at least one event associated with a subset of configured resource groups among the type of configured resource groups.

In some example embodiments, the second apparatus 120 may select a subset of configured resource groups from a type of configured resource groups; and transmitting, to the first apparatus, a resource status request for a report of at least one event associated with the subset of configured resource groups.

In some example embodiments, the second apparatus 120 may receive, from the first apparatus 110, the resource status indication that an event of at least one event is detected for a resource group of the at least one resource group.

In some example embodiments, the second apparatus 120 may further in response to receiving the resource status indication that the event is detected for the resource group, transmit, to the first apparatus, a request for a periodic report of a resource status indication for individual resources included in the resource group.

In some example embodiments, the second apparatus 120 may further receive, from the first apparatus, a further resource status indication that the event for the resource group is resolved.

In some example embodiments, the second apparatus 120 may further based on at least the resource status indication from the first apparatus, transmit at least one of: an indication to the first apparatus that a resource in the at least one resource group is to be deactivated or activated, or a request to a third apparatus that a resource in the at least one resource group is to be deactivated or activated.

In some example embodiments, the resource group may comprise at least one of: a group of cells, a group of beams, a group of network slices, a group of Multiple-Input Multiple-Output layers, a group of data radio bearers, a group of centralized unit user plane instances, a group of quality of service identifiers, or a group of transport network layer associations.

In some example embodiments, at least one of the resource status request or the resource status indication for the at least one resource group may be communicated in at least one of an F1AP message, an E1 message, an Xn message, or an NG message.

All operations and features related to the first apparatus 110 and the second apparatus 120 as described above with reference to FIGS. 1A to 5 are likewise applicable to the methods 600 and 700 and have similar effects. For the purpose of simplification, the details will be omitted.

Example Apparatus, Device and Medium

In some example embodiments, a first apparatus capable of performing any of the method 600 (for example, the first apparatus 110 in FIG. 1A) may comprise means for performing the respective operations of the method 600. The means may be implemented in any suitable form. For example, the means may be implemented in a circuitry or software module. The first apparatus may be implemented as or included in the first apparatus 110 in FIG. 1A.

In some example embodiments, the first apparatus comprises means for receiving, from a second apparatus, a resource status request for at least one resource group; and means for transmitting, to the second apparatus, a resource status indication for the at least one resource group.

In some example embodiments, the first apparatus further comprises: means for in response to receiving the resource status request, monitoring for at least one event associated with the at least one resource group.

In some example embodiments, the means for monitoring comprises means for detecting whether at least one monitoring condition associated with the at least one event is met for the at least one resource group.

In some example embodiments, the means for monitoring comprises: means for in response to an event of the at least one event being detected for a resource group of the at least one resource group, transmitting, to the second apparatus, the resource status indication that the event is detected for the resource group.

In some example embodiments, the first apparatus further comprises: means for in response to absence of the event for the resource group, transmitting, to the second apparatus, a further resource status indication that the event is resolved.

In some example embodiments, the first apparatus further comprises: means for obtaining a resource group configuration including at least one of: a configuration for at least one type of configured resource groups, a configuration for at least one monitoring condition associated with at least one event for the at least one type of configured resource groups, or a configuration for reporting, in response to the at least one monitoring condition being met, a resource status indication that the at least one event is detected.

In some example embodiments, the resource group configuration is configured for the first apparatus through operation administration and maintenance.

In some example embodiments, the first apparatus further comprises: means for transmitting the resource group configuration to the second apparatus.

In some example embodiments, the resource status request comprises a subscription to at least one of: a report of at least one event associated with a type of configured resource groups, or a report of at least one event associated with a subset of configured resource groups among the type of configured resource groups.

In some example embodiments, the first apparatus further comprises: means for after transmitting the resource status indication, receiving, from the second apparatus, an indication that a resource in the at least one resource group is to be deactivated or activated.

In some example embodiments, the resource group comprises at least one of: a group of cells, a group of beams, a group of network slices, a group of Multiple-Input Multiple-Output layers, a group of data radio bearers, a group of centralized unit user plane instances, a group of quality of service identifiers, or a group of transport network layer associations.

In some example embodiments, at least one of the resource status request or the resource status indication for the at least one resource group is communicated in at least one of an F1AP message, an E1 message, an Xn message or an NG message.

In some example embodiments, the first apparatus comprises a distributed unit of a network device, and the second apparatus comprises a central unit of the network device.

In some example embodiments, the first apparatus further comprises means for performing other operations in some example embodiments of the method 600 or the first apparatus 110. In some example embodiments, the means comprises at least one processor; and at least one memory storing instructions that, when executed by the at least one processor, cause the performance of the first apparatus.

In some example embodiments, a second apparatus capable of performing any of the method 700 (for example, the second apparatus 120 in FIG. 1A) may comprise means for performing the respective operations of the method 700. The means may be implemented in any suitable form. For example, the means may be implemented in a circuitry or software module. The second apparatus may be implemented as or included in the second apparatus 120 in FIG. 1A.

In some example embodiments, the second apparatus comprises means for transmitting, to a first apparatus, a resource status request for at least one resource group; and means for receiving, from the first apparatus, a resource status indication for the at least one resource group.

In some example embodiments, the second apparatus further comprises: means for obtaining a resource group configuration including at least one of: a configuration for at least one type of configured resource groups, a configuration for at least one monitoring condition associated with at least one event for the at least one type of configured resource groups, or a configuration for reporting, in response to the at least one monitoring condition being met, a resource status indication that the at least one event is detected.

In some example embodiments, the resource group configuration is configured for the second apparatus through operation administration and maintenance.

In some example embodiments, the second apparatus further comprises: means for receiving the resource group configuration from the first apparatus.

In some example embodiments, the resource status request comprises a subscription to at least one of: a report of at least one event associated with a type of configured resource groups, or a report of at least one event associated with a subset of configured resource groups among the type of configured resource groups.

In some example embodiments, the means for transmitting comprises: means for selecting a subset of configured resource groups from a type of configured resource groups; and means for transmitting, to the first apparatus, a resource status request for a report of at least one event associated with the subset of configured resource groups.

In some example embodiments, the means for receiving comprises: means for receiving, from the first apparatus, the resource status indication that an event of at least one event is detected for a resource group of the at least one resource group.

In some example embodiments, the second apparatus further comprises: means for in response to receiving the resource status indication that the event is detected for the resource group, transmitting, to the first apparatus, a request for a periodic report of a resource status indication for individual resources included in the resource group.

In some example embodiments, the second apparatus further comprises: means for receiving, from the first apparatus, a further resource status indication that the event for the resource group is resolved.

In some example embodiments, the second apparatus further comprises: means for based on at least the resource status indication from the first apparatus, transmitting at least one of: an indication to the first apparatus that a resource in the at least one resource group is to be deactivated or activated, or a request to a third apparatus that a resource in the at least one resource group is to be deactivated or activated.

In some example embodiments, the resource group comprises at least one of: a group of cells, a group of beams, a group of network slices, a group of Multiple-Input Multiple-Output layers, a group of data radio bearers, a group of centralized unit user plane instances, a group of quality of service identifiers, or a group of transport network layer associations.

In some example embodiments, at least one of the resource status request or the resource status indication for the at least one resource group is communicated in at least one of an F1AP message, an E1 message, an Xn message, or an NG message.

In some example embodiments, the second apparatus further comprises means for performing other operations in some example embodiments of the method 700 or the second apparatus 120. In some example embodiments, the means comprises at least one processor; and at least one memory storing instructions that, when executed by the at least one processor, cause the performance of the second apparatus.

Figure 8:
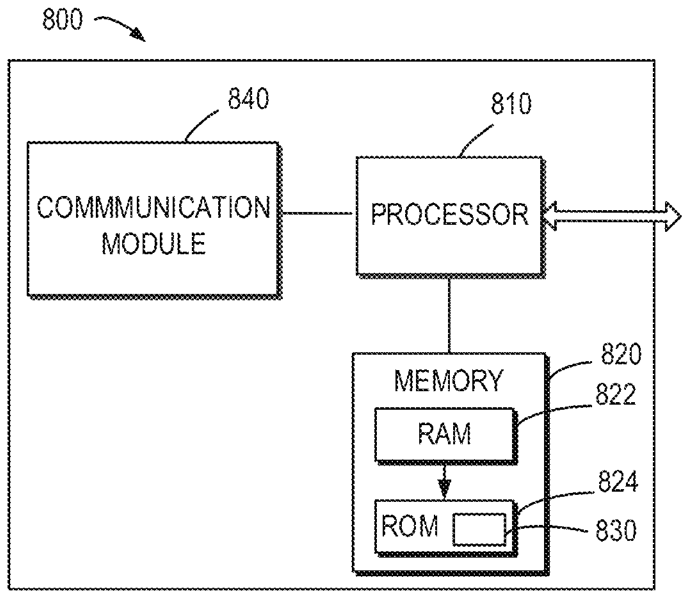
FIG. 8 illustrates a simplified block diagram of a device that is suitable for implementing example embodiments of the present disclosure.

FIG. 8 is a simplified block diagram of a device 800 that is suitable for implementing example embodiments of the present disclosure. The device 800 may be provided to implement a communication device, for example, the first apparatus 110 or the second apparatus 120 as shown in FIG. 1A. As shown, the device 800 includes one or more processors 810, one or more memories 820 coupled to the processor 810, and one or more communication modules 840 coupled to the processor 810.

The communication module 840 is for bidirectional communications. The communication module 840 has one or more communication interfaces to facilitate communication with one or more other modules or devices. The communication interfaces may represent any interface that is necessary for communication with other network elements. In some example embodiments, the communication module 840 may include at least one antenna.

The processor 810 may be of any type suitable to the local technical network and may include one or more of the following: general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

The memory 820 may include one or more non-volatile memories and one or more volatile memories. Examples of the non-volatile memories include, but are not limited to, a Read Only Memory (ROM) 824, an electrically programmable read only memory (EPROM), a flash memory, a hard disk, a compact disc (CD), a digital video disk (DVD), an optical disk, a laser disk, and other magnetic storage and/or optical storage. Examples of the volatile memories include, but are not limited to, a random access memory (RAM) 822 and other volatile memories that will not last in the power-down duration.

A computer program 830 includes computer executable instructions that are executed by the associated processor 810. The instructions of the program 830 may include instructions for performing operations/acts of some example embodiments of the present disclosure. The program 830 may be stored in the memory, e.g., the ROM 824. The processor 810 may perform any suitable actions and processing by loading the program 830 into the RAM 822.

The example embodiments of the present disclosure may be implemented by means of the program 830 so that the device 800 may perform any process of the disclosure as discussed with reference to FIG. 1A to FIG. 7. The example embodiments of the present disclosure may also be implemented by hardware or by a combination of software and hardware.

In some example embodiments, the program 830 may be tangibly contained in a computer readable medium which may be included in the device 800 (such as in the memory 820) or other storage devices that are accessible by the device 800. The device 800 may load the program 830 from the computer readable medium to the RAM 822 for execution. In some example embodiments, the computer readable medium may include any types of non-transitory storage medium, such as ROM, EPROM, a flash memory, a hard disk, CD, DVD, and the like. The term "non-transitory," as used herein, is a limitation of the medium itself (i.e., tangible, not a signal) as opposed to a limitation on data storage persistency (e.g., RAM vs. ROM).

Figure 9:
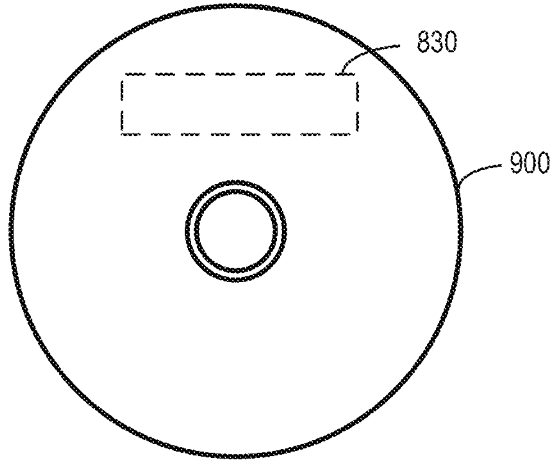
FIG. 9 illustrates a block diagram of an example computer readable medium in accordance with some example embodiments of the present disclosure.

FIG. 9 shows an example of the computer readable medium 900 which may be in form of CD, DVD or other optical storage disk. The computer readable medium 900 has the program 830 stored thereon.

Generally, various embodiments of the present disclosure may be implemented in hardware or special purpose circuits, software, logic or any combination thereof. Some aspects may be implemented in hardware, and other aspects may be implemented in firmware or software which may be executed by a controller, microprocessor or other computing device. Although various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

Some example embodiments of the present disclosure also provide at least one computer program product tangibly stored on a computer readable medium, such as a non-transitory computer readable medium. The computer program product includes computer-executable instructions, such as those included in program modules, being executed in a device on a target physical or virtual processor, to carry out any of the methods as described above. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. The program code may be provided to a processor or controller of a general purpose computer, special purpose computer, or other programmable data processing apparatus, such that the program code, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program code or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, although operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, although several specific implementation details are contained in the above discussions, these should not be construed as limitations on the scope of the present disclosure, but rather as descriptions of features that may be specific to particular embodiments. Unless explicitly stated, certain features that are described in the context of separate embodiments may also be implemented in combination in a single embodiment. Conversely, unless explicitly stated, various features that are described in the context of a single embodiment may also be implemented in a plurality of embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A first apparatus, comprising:

a processor; and a memory storing computer-executable instructions that, when executed by the processor, cause the first apparatus to perform the following operations:

operating as a next generation NodeB (gNB) distributed unit (DU) in a split new radio (NR) architecture;

storing, in response to operation administration and maintenance (OAM) configuration, (i) membership of a power saving group (PSG) defining at least one resource group as a set of cells served by the gNB-DU, and (ii) a monitoring condition comprising physical resource block (PRB) utilization and a high threshold and a low threshold for the PSG;

receiving, from a gNB centralized unit (CU) over an F1 application protocol (F1AP) interface, a resource status request that subscribes the gNB-CU to event notification for the PSG;

computing, for the PSG, a composite PRB utilization across the set of cells;

transmitting, to the gNB-CU over the F1AP interface, a first resource status indication that includes a resource-event-notify information element set to detect when the composite PRB utilization (a) rises above the high threshold or (b) falls below the low threshold; and transmitting, to the gNB-CU over the F1AP interface, a second resource status indication that includes the resource-event-notify information element set to resolved when the composite PRB utilization returns to a range that does not satisfy the monitoring condition.

2. The first apparatus of claim 1, wherein the set of cells forming the PSG are co-located within the first apparatus and are served on a same carrier frequency.

3. The first apparatus of claim 2, wherein the composite PRB utilization is computed as an average PRB utilization across all cells in the PSG over a predefined monitoring time window configured via OAM.

4. The first apparatus of claim 3, wherein the high threshold and the low threshold are different values configured via OAM, and the high threshold is greater than the low threshold to provide hysteresis.

5. The first apparatus of claim 4, wherein the first resource status indication is transmitted only once per threshold crossing event until the composite PRB utilization returns within a range defined by the monitoring condition.

6. The first apparatus of claim 5, wherein the resource status request received over the F1AP interface includes a resource-event-notification-control information element identifying the PSG by a configured group identifier.

7. The first apparatus of claim 6, wherein the computer-executable instructions further cause the first apparatus to, after transmitting the first resource status indication set to detect when the composite PRB utilization (a) rises above the high threshold or (b) falls below the low threshold, receive, from the gNB-CU over the F1AP interface, a request for periodic per-cell resource status reporting for individual cells included in the PSG.

8. The first apparatus of claim 7, wherein the periodic per-cell resource status reporting is performed using a legacy F1AP resource status update procedure distinct from the resource-event-notify information element.

9. The first apparatus of claim 8, wherein the composite PRB utilization is determined based on downlink physical downlink shared channel (PDSCH) PRB utilization only.

10. The first apparatus of claim 9, wherein the computer-executable instructions further cause the first apparatus to perform the transmitting of the first resource status indication only when the PSG comprises at least two cells.

11. A method performed by a first apparatus, the method comprising:

operating as a next generation NodeB (gNB) distributed unit (DU) in a split new radio (NR) architecture;

storing, in response to operation administration and maintenance (OAM) configuration, (i) membership of a power saving group (PSG) defining at least one resource group as a set of cells served by the gNB-DU, and (ii) a monitoring condition comprising physical resource block (PRB) utilization and a high threshold and a low threshold for the PSG;

receiving, from a gNB centralized unit (CU) over an F1 application protocol (F1AP) interface, a resource status request that subscribes the gNB-CU to event notification for the PSG;

computing, for the PSG, a composite PRB utilization across the set of cells;

transmitting, to the gNB-CU over the F1AP interface, a first resource status indication that includes a resource-event-notify information element set to detect when the composite PRB utilization (a) rises above the high threshold or (b) falls below the low threshold; and transmitting, to the gNB-CU over the F1AP interface, a second resource status indication that includes the resource-event-notify information element set to resolved when the composite PRB utilization returns to a range that does not satisfy the monitoring condition.

12. The method of claim 11, wherein the set of cells forming the PSG are co-located within the first apparatus and are served on a same carrier frequency.

13. The method of claim 12, wherein the composite PRB utilization is computed as an average PRB utilization across all cells in the PSG over a predefined monitoring time window configured via OAM.

14. The method of claim 13, wherein the high threshold and the low threshold are different values configured via OAM, and the high threshold is greater than the low threshold to provide hysteresis.

15. The method of claim 14, wherein the first resource status indication is transmitted only once per threshold crossing event until the composite PRB utilization returns within a range defined by the monitoring condition.

16. The method of claim 15, wherein the resource status request received over the F1AP interface includes a resource-event-notification-control information element identifying the PSG by a configured group identifier.

17. The method of claim 16, further comprising: after transmitting the first resource status indication set to detect when the composite PRB utilization (a) rises above the high threshold or (b) falls below the low threshold, receive, from the gNB-CU over the F1AP interface, a request for periodic per-cell resource status reporting for individual cells included in the PSG.

18. The method of claim 17, wherein the periodic per-cell resource status reporting is performed using a legacy F1AP resource status update procedure distinct from the resource-event-notify information element.

19. The method of claim 18, wherein the composite PRB utilization is determined based on downlink physical downlink shared channel (PDSCH) PRB utilization only.

20. The method of claim 19, further comprising: performing the transmitting of the first resource status indication only when the PSG comprises at least two cells.

* * * * *